United States Patent [19]

Edwards

[11] 4,249,186
[45] Feb. 3, 1981

[54] PROCESSOR SYSTEM FOR DISPLAY AND/OR RECORDING OF INFORMATION

[75] Inventor: Roger D. Edwards, Solihull, England

[73] Assignee: Leeds & Northrup Limited, Birmingham, England

[21] Appl. No.: 934,814

[22] Filed: Aug. 18, 1978

[30] Foreign Application Priority Data

Aug. 24, 1977 [GB] United Kingdom ............. 35557/77

[51] Int. Cl.³ ............................................. G01D 9/00
[52] U.S. Cl. ................................. 346/35; 346/76 PH
[58] Field of Search ............................ 346/35, 76 PH

[56] References Cited

U.S. PATENT DOCUMENTS

| 3,971,041 | 7/1976 | Mason | 346/76 PH |
| 4,131,900 | 12/1978 | Erb et al. | 346/35 |

FOREIGN PATENT DOCUMENTS

| 907840 | 10/1962 | United Kingdom . |
| 991791 | 5/1965 | United Kingdom . |
| 1057892 | 2/1967 | United Kingdom . |
| 1358586 | 7/1974 | United Kingdom . |
| 1434050 | 4/1976 | United Kingdom . |
| 1436639 | 5/1976 | United Kingdom . |

Primary Examiner—Monroe H. Hayes
Attorney, Agent, or Firm—Robert F. O'Connell

[57] ABSTRACT

A multipoint display or recorder system is based upon a digital processor which controls the sampling of data points and the storage of digital values to be displayed or recorded. A digital display device or recorder (e.g. a colummn of LED's or a dot—printing thermal recorder) is controlled by the stored digital values. The processor is capable of determining independent rates for sampling the data points, refreshing the display and effecting read out to the recorder, each rate being matched to the characteristics of the corresponding peripheral (multiplexing sampler and ADC, display device and recorder). The digital processor enables other functions to be performed, e.g. display of alarm levels for the sampled variables and automatic control of the process giving rise to the variables.

2 Claims, 14 Drawing Figures

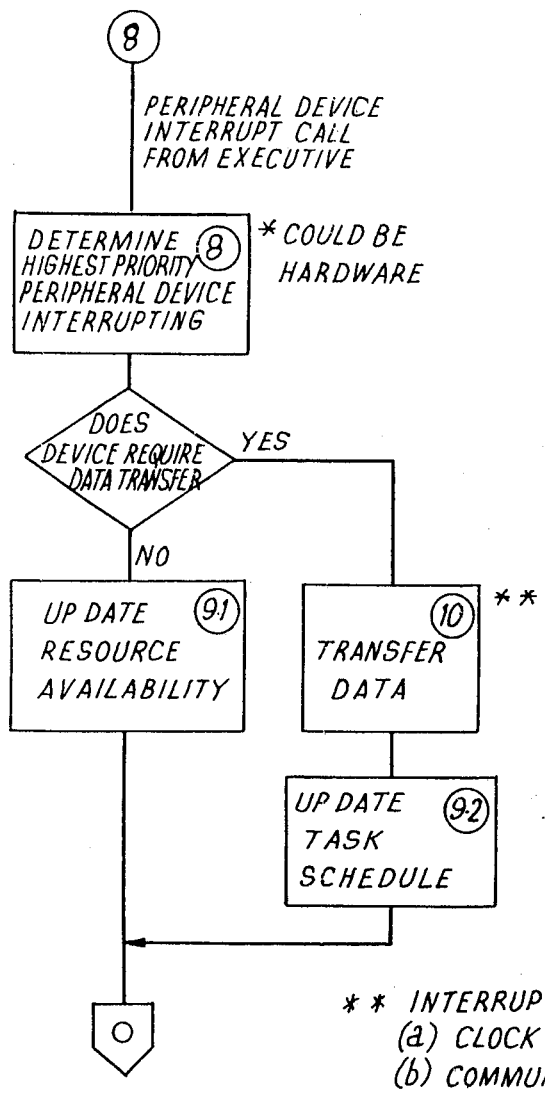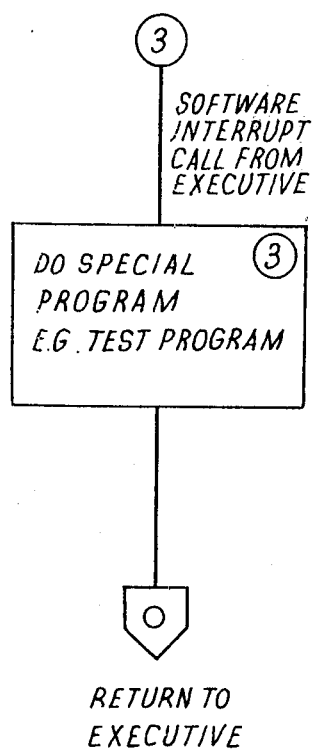

FIG. 12

⑥ DO TASK CALL FROM EXECUTIVES

DO SUBROUTINES NOT REQUIRING DIRECT ACCESS TO PERIPHERAL DEVICES, SUCH AS:— ⑥

(a) DATA INPUT FROM BUFFER AREA
 E.G. ANALOGUE PLANT DATA, KEYBOARD ETC.
(b) DATA OUTPUT TO BUFFER AREA
 E.G. DISPLAY BUFFER, PRINT BUFFER
(c) COMMUNICATIONS
(d) MESSAGE HANDLING
(e) CALCULATIONS
 E.G. FOR INPUT LINERISATION ETC.
(f) CLOCK
 E.G. COUNT OF TIME AND DATE
(g) FILE MANAGEMENTS
 E.G. FILES FOR
  (1) SUB ROUTINE LIBRARY
  (2) VARIABLE RECORDS  E.G. PLANT DATA
  (3) TYPE RECORDS      E.G. LINERIZATION REQUIRED
  (4) LIMIT RECORDS     E.G. LIMITS REQUIRED
  (5) CONSTANT RECORDS  E.G. CONSTANTS FOR (3) & (4) ABOVE
  (6) RESTART RECORDS   E.G. FOR SAFE CONDITIONS
   ETC.

ETC.

SPECIAL TASKS FOR ERROR RECOVERY & DIAGNOSTICS ⑦

 RETURN TO EXECUTIVE

PROCESSOR SYSTEM FOR DISPLAY AND/OR RECORDING OF INFORMATION

The present invention relates to a digital processor system for providing a display and/or visual record representing the physical variables of some process.

In the control of industrial plant operations, patient monitoring systems or similar processes having a number of associated physical variables, an indication of the variation of those variables with time is very useful. The physical variables may be any of a number of parameters such as temperature, pressure, speed, position or weight. These variables are generally sensed by transducers which produce outputs such as voltage levels, the frequency of an alternating voltage or digital signals, the outputs being related to the physical variables. A real time visual indication and a record of the physical variables relating to such a process can be derived from these signals.

The display of variables obtained from processes is not in itself new. There are numerous chart recorders and numerical displays available. The present invention provides a display and/or visual record using a digital processor system which overcomes many of the problems associated with processing input variables.

In particular, so-called multipoint recorders are known which are electromechanical devices capable of sampling signals in a cyclic sequence and causing a chart record to be produced with a plurality of identified traces showing the variation of each signal with time. Such recorders suffer from various drawbacks. Electromechanical devices are liable to give rise to trouble in many industrial environments and are essentially slow speed devices to whose operating characteristics the sampling of the signals has to be matched.

A multipoint chart recorder which is not electromechanical is known from U.S. Pat. No. 3,971,041. The recorder has a print head with heat generating "dots" which are energised to form a record on heat-sensitive paper. Analog inputs are converted on a time division multiplex basis into digital signals which control the print head. Although the disadvantages associated specifically with electromechanical devices are avoided, it remains necessary to synchronise the sampling of the analog inputs to the operations of the print head, which is an undesirable restriction in many situations.

According to the present invention, there is provided a digital processor system for providing a display and/or visual record representing a plurality of varying signals comprising a clock source producing regular electrical signals, a control means coordinating a number of time-shared operations synchronised by signals derived from the clock signals, input circuitry for feeding the varying signals sequentially to the processor system in a first of the said operations and at a first rate determined by the control means, means for deriving digital signals representing the varying signals in a second of the said operations, means for processing the digital signals and placing them in a store in a third of the said operations, a recording device and/or display means, means for obtaining values from the store in a fourth of said operations and transferring them to the recording device and/or display means at a second rate determined by the control means in a form such that the recording device and/or display means produce a visual record and/or display representing the varying signals.

The recording device is preferably a chart recorder having a time axis and a second axis orthogonal to the time axis, and a plurality of individual marking devices distributed along the second axis. It can then be arranged, in each of a succession of recording intervals, corresponding to the fourth operations and to predetermined increments of movement along the time axis, to actuate such of the marking devices as is required by the stored digital signals.

The features of the present invention will become apparent in the preferred embodiment described below, firstly in general terms and then in more detail with reference to the drawings.

In a system embodying the invention, a number of signals representing the physical variables obtained from a process are fed into a digital processor system at a data input point. A microprocessor controls the operation of the system using software contained in a store. The signal channels are each sampled in turn by an input multiplexer and, if analogue are digitised by an ADC with a gain ranging facility. The multiplexed signals are then linearised by software before being placed in a store. When samples of all the signal channels have been processed and stored, a software subprogram is used to drive display and/or chart recorder peripherals. The display peripheral may provide a numerical or bar graph display and can be the type of display device which requires cyclic refreshing. The refresh cycle from the store can be programmed independently of the other functions performed by the processor system.

The chart recorder provides a graphic indication of the variation of the parameters of the process with time. The processor is capable of identifying each trace corresponding to a particular variable by means of a printed symbol. A time scale and actual values of time can be derived from an external clock and printed periodically on the chart.

The bar graph display provides a visual indication of the current values of each of the parameters. In the embodiment to be described, the display is constructed from a number of LED arrays although liquid crystal, gas discharge or other arrays can be used.

The features of the invention will now be described in detail, by way of example, with reference to the accompanying drawings wherein:

FIG. 8 shows a software interrupt program in detail;

FIG. 9 shows a peripheral interrupt program in detail;

FIG. 12 shows task and file management programs in detail.

Figure 1:
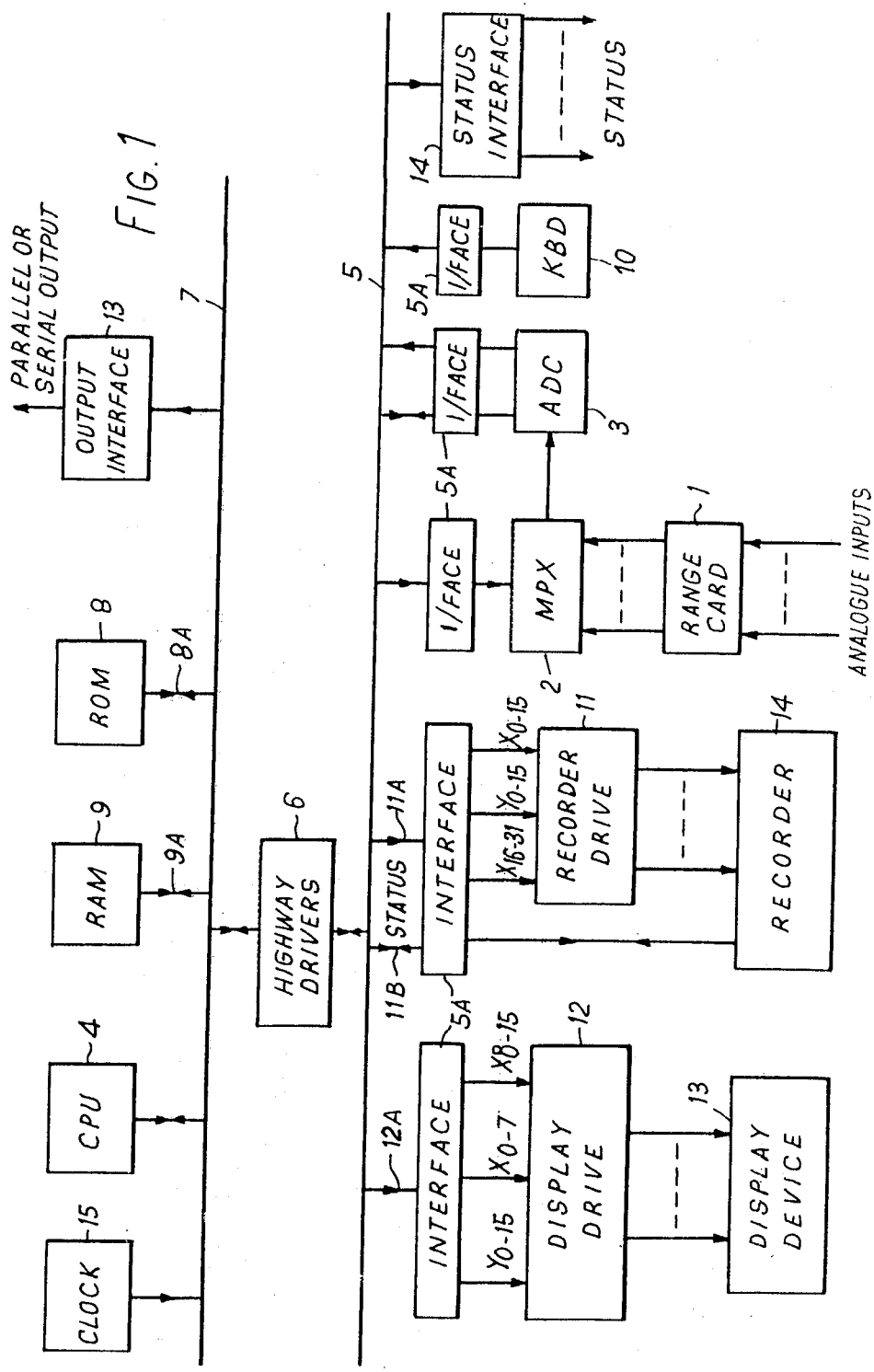
FIG. 1 represents a preferred processor system embodying the present invention.
Figure 2:
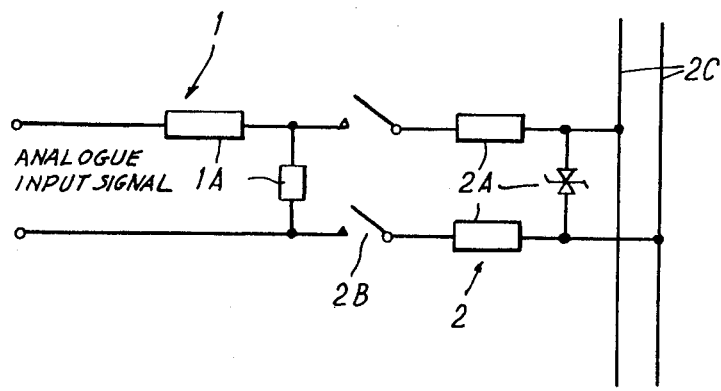
FIG. 2 shows a multiplexer used in the processor system.

In the illustrated embodiment, analogue input signals from a plurality of measuring points are fed to the processor as shown in FIG. 1. Each analogue signal corresponding to a particular physical variable is passed through a conventional potential divider 1A in a range card before being sampled in turn by an analogue multiplexer 2 as shown in FIG. 2 and fed to an ADC 3. The multiplexer may be of the reed relay type for fairly low level signals and switching speeds or solid state FET multiplexers may be used. As well as a conventional protection circuit 2A for each input signal, the multiplexer includes a two-pole switch 2B for each input signal although one pole switching can be employed in known manner. The circuitry for only one input signal is shown. The multiplexer closes the switches 2B for the different input signal in cyclic or random sequence so as to multiplex the range-scaled analogue signals on to a line 2C feeding the ADC 3. For operation with many input signals, the multiplexer can employ a hierarchical switching arrangement, in a manner known per se, in order to simplify the addressing of the switches.

A CPU 4 provides control signals for the multiplexer 2 via a highway system to be described and sets the gain of a pre-amplifier in the ADC 3 via a status line, (included in the highway system) suiting the preamplifier gain to each input signal individually. The multiplexer control signals control the switching of the multiplexer through its sequence of switching states. Digital signals produced by the ADC 3 are fed to an external data highway 5 and pass through drivers 6 to an internal data highway 7. The drivers 6 are used to allow signals to pass between the internal data highway and the external data highway which are functionally the same but physically separate to enable the drivers 6 to provide higher power on the external highway 5 than the CPU 4 is capable of providing. The peripheral devices communicate with the data highways via standard interface circuits 5A.

The digital signals are linearised by software held in a ROM 8 before being stored in a RAM 9. The majority of the standard software used for detailed operation of the system is held in the ROM 8 and will be described in greater detail hereinafter. The ROM and RAM are shown connected to the highway 7 by lines 8A and 9A respectively, which represent both address and data lines. Application software of a higher level can be applied to the system by an operator using a keyboard 10.

The operation of the CPU 4 is governed by dynamic clock pulses from a clock 15 and each action is performed according to regular interrupt signals derived from the clock signals. The processor can keep real time by the use of an external clock which may be linked to mains frequency. A counter is initialised to the current time by an instruction from the keyboard 10, and clock pulses are counted by the software. The keyboard 10 may also be used to set a number of alarm levels which will be described in more detail hereinafter. At an output interface 13, data may be obtained in serial or parallel form depending on the particular system used if it is desired to retain a computer print out. A status output interface 14 is also provided and may include a number of alarm relays.

A recorder drive unit 11 is connected to the external data highway 5 by a number of data lines 11A and status lines 11B. A display drive unit 12 is also connected by a number of data lines 12A to the external data highway 5.

The CPU communicates with the input side of the system (multiplexer 2 and ADC 3), with the recorder drive unit 11 and with the display drive unit 12 in a time-shared manner such that the rate of communication with each of the three entities in question is suited to the characteristics thereof and the characteristics of the recorder for example, do not place undesirable constraints upon the communication with the input side of the system and so on. The communication with the multiplexer 2 and ADC 3 is matched to the required sampling rate for the input signals. The communication with the recorder drive unit is matched to the requirement to effect one print cycle for each increment of chart movement, while the communication with the display drive unit is matched to the refresh cycle of a display device 13 driven by the unit 12. The frequency of a complete multiplexing cycle (i.e. cycle of sampling all analogue inputs) does not have to be the same as the frequency of the incremental chart movements any more than it has to be the same as the frequency of the display refresh cycle.

Figure 3:
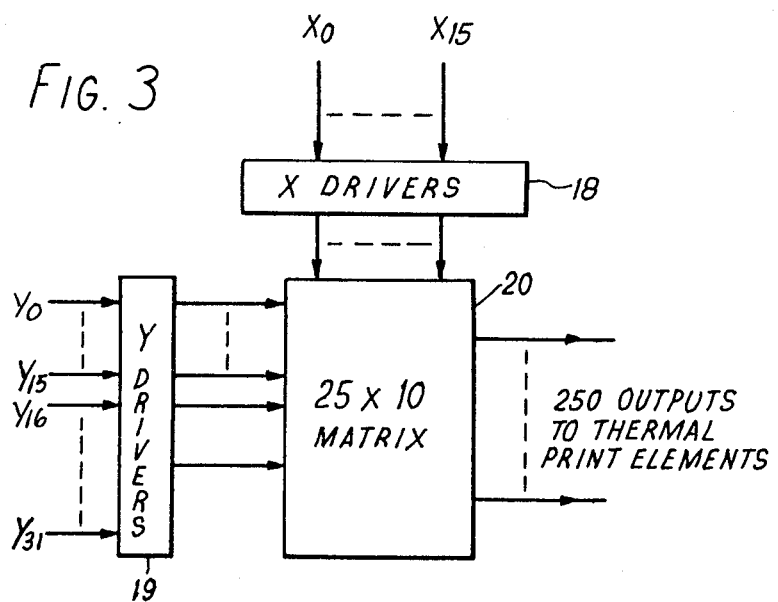
FIG. 3 represents a recorder drive unit of the processor system.
Figure 3A:
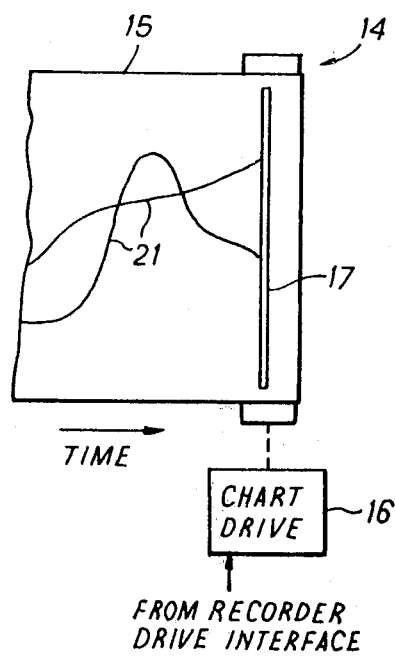
FIG. 3A represents the recorder.

The recorder drive unit 11 drives a recorder 14 shown in FIG. 3A. The recorder is a chart recorder with a chart 15 driven on a time axis by an incremental drive unit 16. One increment of drive is effected for each pulse provided from the CPU 4 on one status line 11B and to each such pulse there also corresponds a print cycle. Another status line may be used to command fast wind on the chart and another may be used, as described below to control print intensity. In the reverse direction, the status lines 11B are used conventionally to signal conditions such as "paper low", "paper out" and "busy".

Figure 3B:
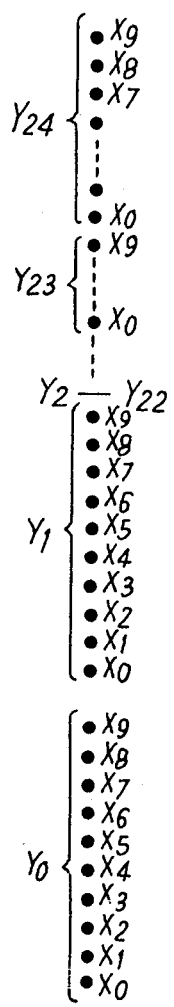

The recorder uses theremosensitive paper and orthogonal to the time axis is arranged a column 17 of 250 closely spaced thermal printing elements. When any element is energised, it heats up and causes a dot to be printed on the chart 15. The elements are shown in FIG. 3B grouped in 25 segments $Y_0$-$Y_{25}$ of 10 elements $X_0$-$X_9$ each. Any one element can be selected uniquely as the element $Y_i X_j$ where i is any value from 0 to 24 and j any value from 0 to 9. The number 250 is arbitrary. It may be desired to have a larger number of elements, say 500, in which case the X, Y addressing scheme is extended or three-coordinate (X,Y,Z) addressing is employed. 512 elements can be addressed by $X_0$-$X_7$, $Y_0$-$Y_7$, $Z_0$-$Z_7$.

Within each print cycle, the CPU 4 examines a print buffer register in the RAM 9 which stores for every combination $Y_i X_j$ a bit indicating whether or not a dot is to be printed. If a dot is to be printed, selected ones of the lines 11A (FIG. 1) are energised, namely the line $Y_i$ and the line $X_j$. Since the system is organized on the basis of 16 or 8-bit bytes, the lines 11A are shown to include lines $X_0$ to $X_{15}$ and $Y_0$ to $Y_{31}$ some of which are redundant so far as the specific recorder under consideration is concerned.

The recorder drive unit (FIG. 3) consists essentially of a set of X drivers 18, a set of Y driver 19 and a 25×10 diode matrix which decodes any input combination $Y_i X_j$ to a corresponding single output connected to the corresponding thermal printing element 17. The described arrangements requires three bytes from the computer to drive the recorder. It might be preferred to arrange 256 elements 16 in 16 groups of 16 and to drive them from a 16×16 matrix which would require only two sixteen bit bytes, namely $X_0$-$X_{15}$ and $Y_0$-$Y_{15}$.

The system can operate with more than one print cycles for each multiplexing (measurement) cycle. In this case the RAM 9 is used to store not only the last measured set of linearised digital values but also at least the preceding set. A linear or other interpolation program is then used to calculate interpolated values for each print cycle and bits are entered in the corresponding cells of the print buffer register. As the dots are printed in conjunction with the incremental movement of the chart 15, traces 21 are drawn thereon (FIG. 3A) representing the measured variables against time, only two traces being shown for simplicity.

Desired print intensities for each of the dots can also be stored along with the digital values to provide the facility of printing dark and light traces, graduated charts and timing lines. Thus, it is not necessary to use pre-printed charts. Another use of this facility can be in conjunction with a paper which prints in different colours, depending upon the temperature of the printing element. Horizontal chart divisions can be printed by programming the CPU 4 to print, preferably at light intensity or in a different colour, in every print cycle using the elements 17 which are at the positions of the required divisions. Vertical divisions can be printed by programming the CPU 4 to print in selected print cycles using every one of the elements 17, again preferably at light intensity or in the different colour. The dots are always, however, printed one at a time by the elements 17. By printing one dot at a time the peak power consumption is kept at a relatively low constant level.

However if faster printing is required then it is possible to print a number of dots simultaneously.

Between printing operations, the print drive subroutine controls the incremental movement of the paper using the drive unit 16. The subroutine is initiated at a frequency appropriate to the selected chart speed.

Time markers are printed on the charts representing regular intervals derived from an internal clock or representing real time breaks by the use of an external clock. In the latter case, real time and date values can be printed periodically to annotate the time markers. Alphanumeric or geometrical symbols are periodically printed to identify individual traces on the chart. At a time determined by the CPU 4, when a symbol is to be printed, a base point for the symbol, adjacent the trace thereof, is determined by the current value of the variable to lie a predetermined vectorial distance from the point corresponding to the current value and is stored in the RAM 9. The symbol is built up and printed using the stored value and in this way the distortional skew effect which would result from positioning the symbol alongside a rapidly changing trace is avoided. The print subroutine also determines whether to print the symbol above, on or below the trace. This solves the problem of identifying traces printed at the upper and lower limits of the printer.

Thus, the base point can be selected to be above the trace when the value of the variable is less than half the full scale value and to be below the trace when the value is at least equal to the full scale. The CPU 4 can readily be programmed to print symbols as will be clear from a simple example of the symbol L. Let the base point be determined as point n in one print cycle where n is a value from 0 to 249 determined from the current value of the variable which can be represented as n'. n will be determined as n=n'+a where a is a small fixed integer if the base point is to be above the trace or as n=n'−b, where b is a small fixed integer larger than a (to take account of the height of the symbol) if the base point is below the trace. The values of n and n' obviously correspond to the different $Y_i X_j$ values. To print the symbol L, it is merely necessary to print at points n', n+1, n+2, n+3 and n 4 (say) in the said one print cycle and at point n only in the next 3 (say) print cycles.

Figure 4:
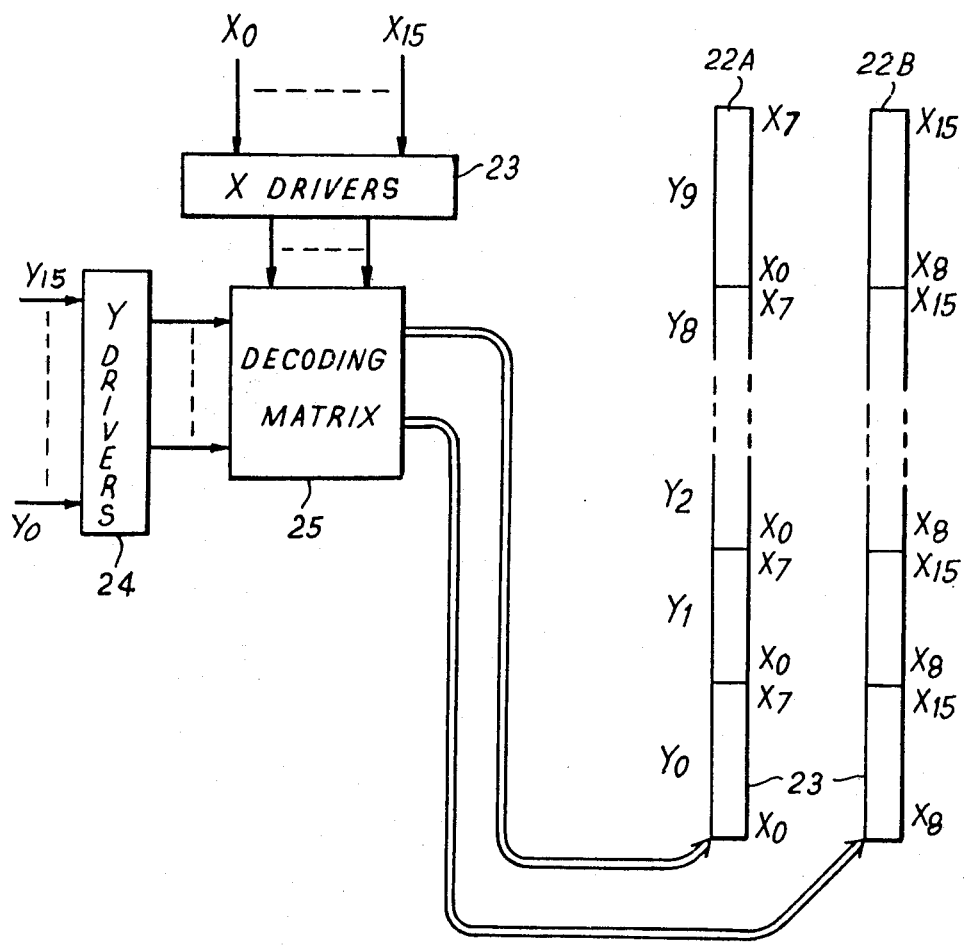
FIG. 4 represents a display arrangement of the processor system.

The display device 13 provides a bar graph or "thermometer" type of display for say, two selected variables, showing the current values thereof. The variables to be displayed thus can be selected by use of the keyboard 10. The display (FIG. 4) comprises two columns 22A and 22B of 100 LEDs each. The individual LEDs are not represented but each column comprises 13 sections 23 with 8 LEDs in each. The sections are denoted $Y_0$ to $Y_9$ up the columns while the LEDs in each section are denoted $X_0$ to $X_7$ up the section in the case of column 22A and $X_8$ to $X_{15}$ up the section in the case of column 22B. In a manner closely analogous to the described arrangement for driving the recorder elements 17, any selected LED or group of LEDs can be illuminated by a signal $Y_i X_j$ where i now runs from 0 to 9 and j runs from 0 to 15 (0 to 7 for column 22A and 8 to 15 for column 22B).

The RAM 9 contains further buffer registers in which bits are entered to denote the LEDs to be illuminated. A bit is entered in the cell of one register corresponding to the current value of one variable and in the cell of another register corresponding to the current value of the other variable. Bits are filled in all cells corresponding to lower values. As, during each refresh cycle, all possible $Y_i X_j$ values are scanned through, the signals $Y_i$ and $X_j$ are sent on the lines 12A if the buffered bit is 1. X and Y drivers 23 and 24 drive another decoding matrix 25 which has individual connections to the LEDs of columns 22A and 22B such that, for any $Y_i X_j$ input, the corresponding LED is illuminated. The CPU 4 provides refresh signals for the LEDs at a frequency sufficient for persistence of vision to give a continuous display, typically in the region of 25–50 Hz.

The processing capabilities of the CPU4 make it possible to employ the LED display to provide additional information. In particular the aforementioned alarm levels can be shown. Consider the case of one high alarm level and one low alarm level, the high alarm level can be displayed by illuminating one LED, which will be above the column of illuminated LED's showing the value of the variable. The low alarm level could be shown by turning off one LED so that there is a break in the column of illuminated LED's. However confusion would then be caused if the display included an LED which was faulty and permanently off. For this reason the low alarm level is preferably indicated by flashing one LED in the column of illuminated LED's.

When an alarm level is reached, the alarm can be given by way of the display itself. One of many possibilities is to flash the whole column of LED's 22A or 22B, regardless of which alarm level has been reached. The advantage of this is that an alarm is given clearly even when the low alarm level is zero.

Figure 5:
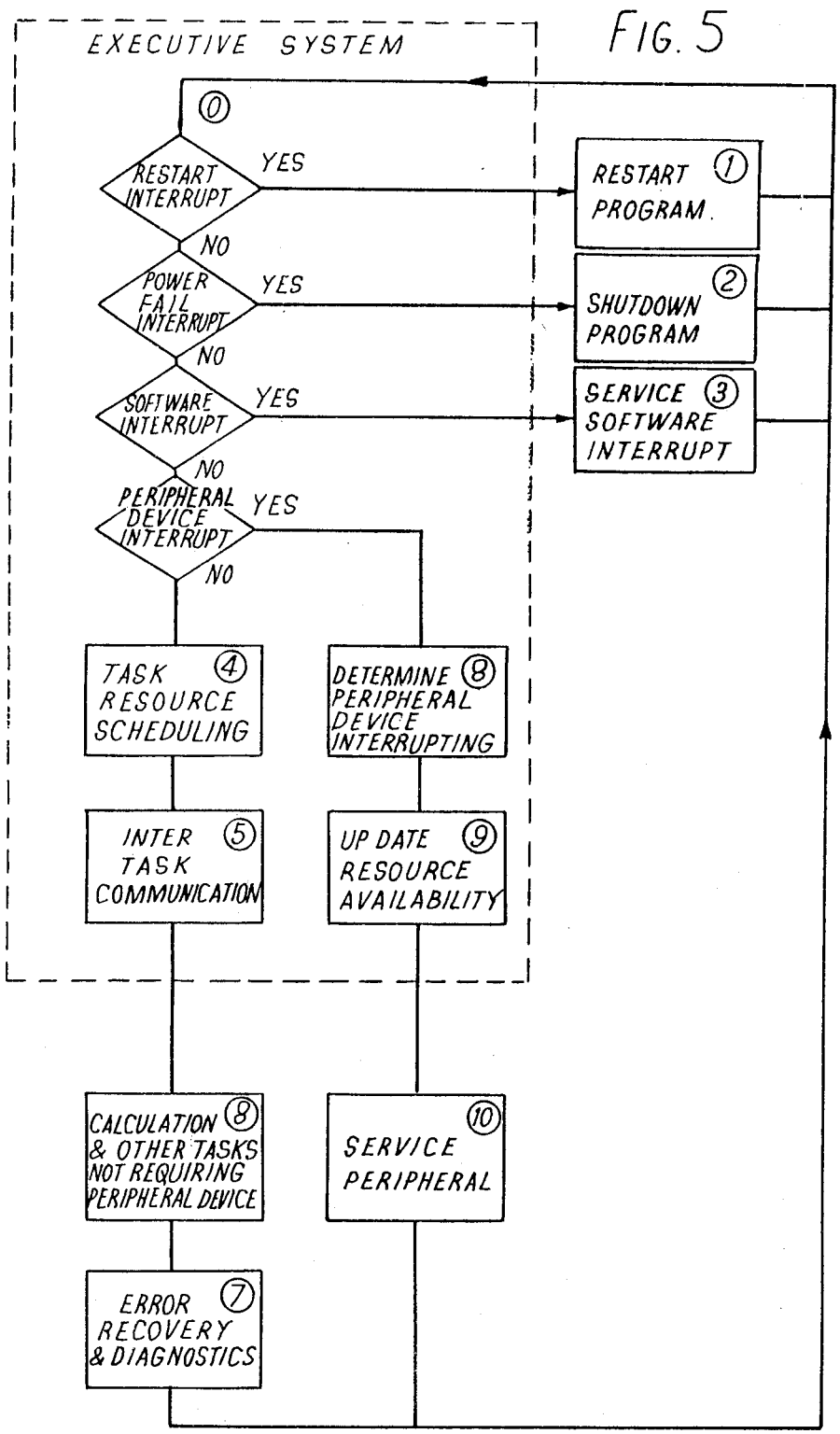
FIG. 5 is a flow chart showing the basic software structure used in the processor system.

FIG. 5 represents a flow chart showing the software structure used in the processor system described. The software comprises a number of tasks, each consisting of a number of subroutines and a special code. An executive task coordinates the application of the tasks and operates on data stored in files. The processor system runs in real time in response to interrupts generated by the hardware of software and fed to the executive task. The executive task responds to the interrupts according to their order of priority.

Figure 6:
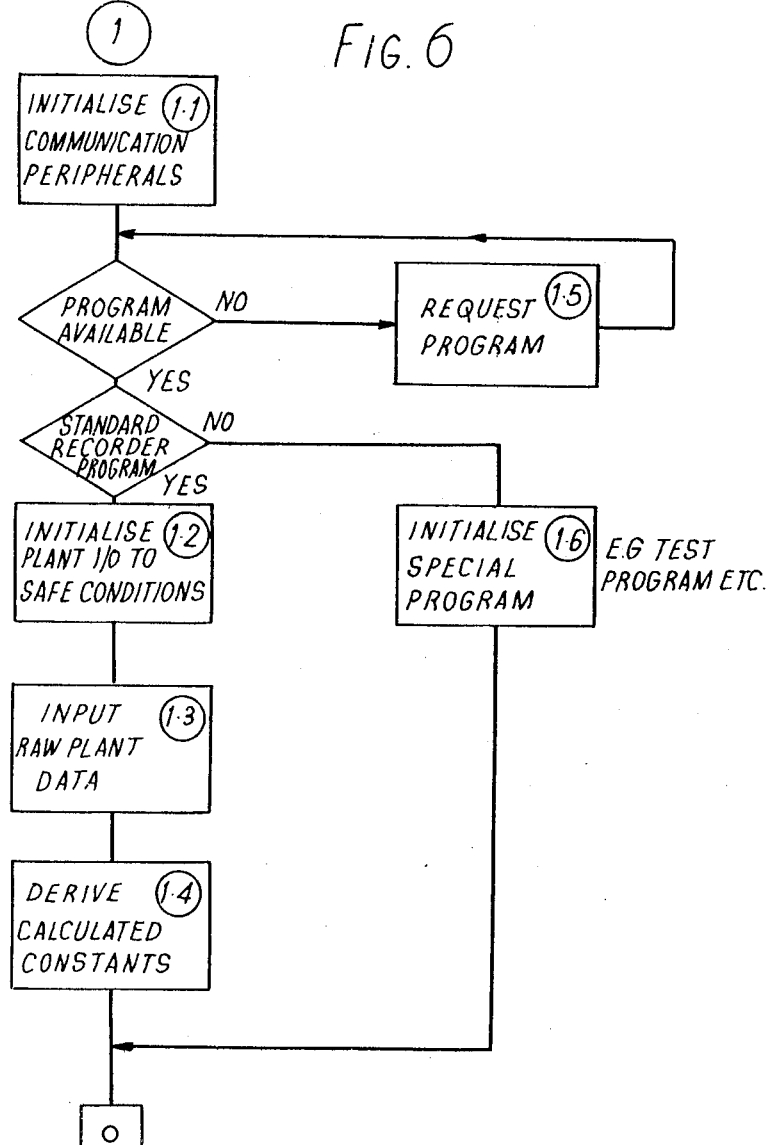
FIG. 6 shows a restart program in detail.

Referring to FIG. 5, when a restart interrupt is generated by switching on the system power, the executive task calls a special restart program. This program is shown in greater detail in the flow chart in FIG. 6. The restart program sets all the hardware to a safe operating condition and checks that the current programs and files are loaded. The communication peripherals are initialised to allow data and programs to enter from external devices such as operator stations and central mass storage media. Test programs and files can be entered if there is no locally available program held in the system. Plant peripherals are set to initial safe conditions using the data loaded into the memories and standard alarm relays are energised. The alarms are used to give various warnings at the operator station such as power failures or serious system errors. Having set up the system, raw data from the process is fed in at the data input point. The CPU 4 may calculate constants from this input data for use in linearising data. A power fail interrupt is generated when the system power deviates from some safe operating level. FIG. 5 shows how the executive task responds to such an interrupt by calling a shut-down program.

Figure 7:
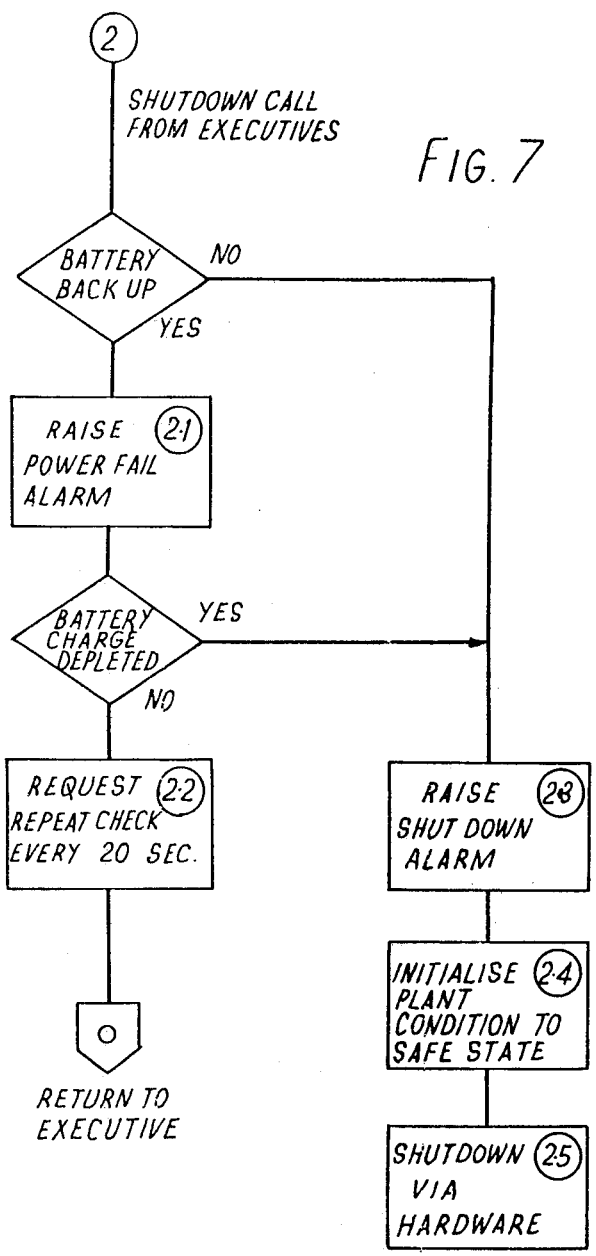
FIG. 7 shows a shut-down program in detail.

FIG. 7 is a flow chart showing the operation of the shut-down program. The system can be transferred to back-up battery and power fail alarms raised at the operator station. Battery back-up can be used to retain all the data in the memories while the program puts the system into a power conservation mode. Then upon the restoration of power, part of the restart program may be bypassed. The program also times the charging of the batteries to indicate the state of charge available for subsequent power failures. In the event of a complete shut-down, the plant peripherals are initialised to a safe condition and shut-down alarms are raised.

During operation, test programs are performed by using the software interrupt shown in FIG. 5. FIG. 8 shows the flow chart of a test program used for maintenance and system debugging. These operations are performed on line and the executive task is structured to accept the test program which uses the software interrupt facilities to simulate various hardware conditions.

The executive task responds to peripheral device interrupts by proceeding through an interrupt program as shown in FIG. 5. FIG. 9 is a flow chart showing the operation of the interrupt program. The program examines the priority of peripheral interrupts and determines the optimum scheduling of the hardware resources. To enable the program to do this, a priority sequence is allocated to the hardware and software. When an available peripheral device generates an interrupt, the program suspends the current task and if the peripheral is required, it calls a task to handle it. A task controls a device by transferring a few bytes of data from one area of memory to another or to the device. The original task is allowed to continue when the peripheral is no longer required. Peripherals requiring such service may include the printer drive, the chart drive, the display refresh circuitry, the communications or the clock circuitry.

Figure 10:
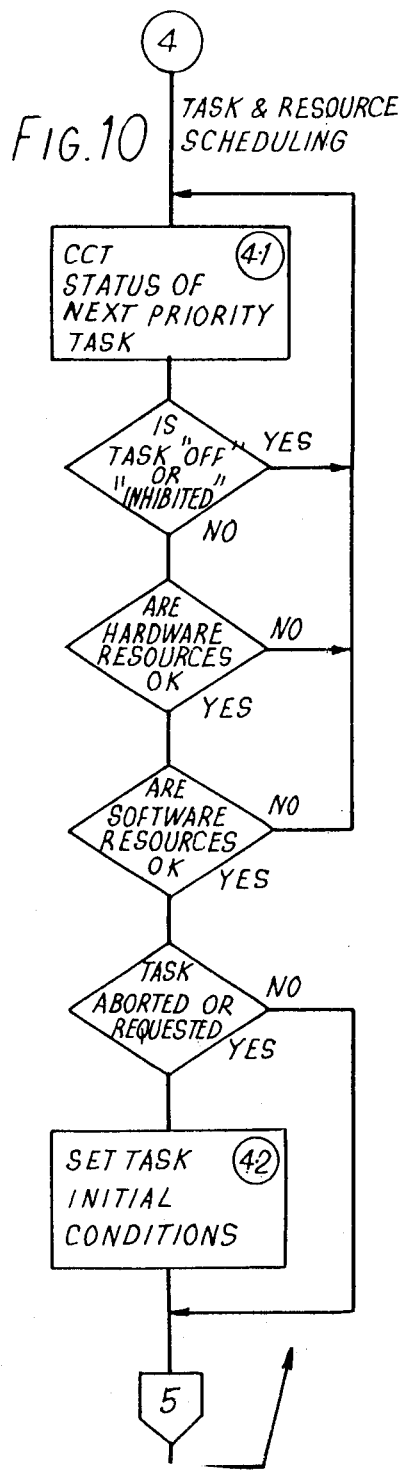
FIG. 10 shows task and resource scheduling programs in detail.

When the executive task receives no interrupts, it is concerned with optimally scheduling the tasks and resources, handling inter-task communications, and controlling error recovery and diagnostics. The flow chart in FIG. 10 shows the scheduling program. The program allocates a priority to each task and also a status byte defining various states of the task such as active, pending, complete or inhibited. In response to the priorities and status, the program brings the tasks to an active state at the required frequency as determined by a count of time. It checks that the hardware and software resources are in order and will then proceed to set up the next requested task.

Inter-task communication proceeds through the executive which holds all the information relating to the detailed code structure of the various tasks and their locations in the memory. This simplifies the writing of task programs and the addition of any new tasks into the system. The executive also monitors the inter-task communications to trap any illegal calls caused by errors thereby enhancing the system's security.

Figure 11:
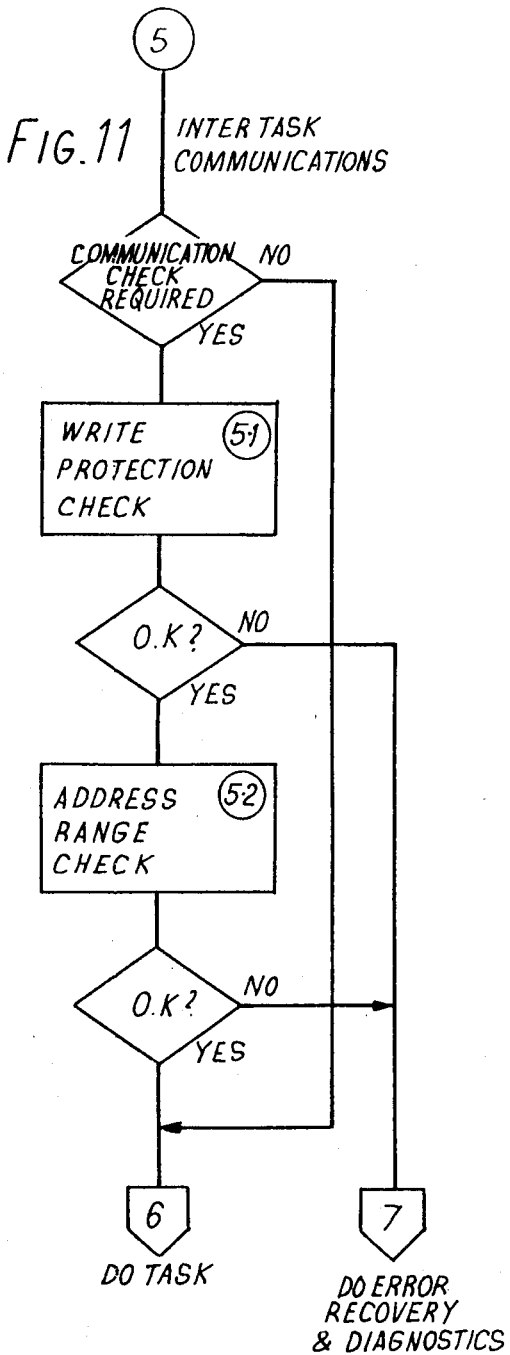
FIG. 11 shows an intertask communications program in detail.

The inter-task communications program is shown in the flow chart in FIG. 11. The program performs several checks before proceeding to the next task. If any of the checks reveal errors, the program transfers to the error recovery and diagnostics program.

Following the inter-task communication program, the processor proceeds to tasks not requiring peripheral devices. FIG. 12 is a flow diagram representing the tasks and file management subroutines which proceed without direct addressing of peripherals. The tasks include the transfer of data to and from the buffer stores, communications and message handling, calculating constants for linearising data, and counting time from clock pulses. When these tasks have been completed, the error recovery and diagnostics programs are carried out.

Error recovery involves classifying errors and communicating them to a maintenance operator station. When the errors are serious, the system is structured to recognise them and respond by shutting down. Diagnostics are performed by calculating constants in different ways and then comparing the results.

Since the described system is based upon a processor (CPU 4) it is possible to use the system also for control purposes, the appropriate control programs being entered in the ROM 8 or RAM 9 and the signals from the interface 13 being employed to effect the necessary control functions.

I claim:

1. A digital processor system for providing a display representing a plurality of varying signals, said system comprising a clock source producing regular electrical signals, a control means coordinating a number of time-shared operations synchronized by signals derived from the clock signals, input circuitry for feeding the varying signals sequentially to the processor system in a first of the said operations and at a first rate determined by the control means, means for deriving digital signals representing the varying signals in a second of the said operations, means for processing the digital signals and placing them in a store in a third of the said operations, display means for providing a visual bar graph display with one bar for each varying signal, the display means comprising a plurality of display elements for each bar, and means for obtaining values from the store in a fourth of the said operations and transferring them to the display means at a second rate determined by the control means to control actuation of the display elements.

2. A digital processor system for providing a display and a visual record representing a plurality of varying signals, said system comprising a clock source producing regular electrical signals, a control means coordinating a number of time-shared operations synchronized by signals derived from the clock signals, input circuitry for feeding the varying signals sequentially to the processor system in a first of the said operations and at a first rate determined by the control means, means for deriving digital signals representing the varying signals in a second of the said operations, means for processing the digital signals and placing them in a store in a third of the said operations, a recording device and display means for providing a visual record and a visual display respectively, means for obtaining values from the store in a fourth of the said operations and transferring them to the recording means at a second rate determined by the control means in a form such that the recording means produce the said visual record and transferring them to the display means at a third rate which is different from the second rate and is determined by the control means in a form such that the display means produce a display representing the varying signals.

* * * * *